Nov. 9, 1965

V. KOLLERUP 3,216,403

METHOD FOR CONTROLLING A ONCE-THROUGH BOILER AND
CONTROLLING SYSTEM FOR PERFORMING THE METHOD

Filed Aug. 26, 1963

3 Sheets-Sheet 1

INVENTOR

Vagn Kollerup

BY *Stevens, [illegible]*

ATTORNEYS

United States Patent Office 3,216,403
Patented Nov. 9, 1965

3,216,403
METHOD FOR CONTROLLING A ONCE-THROUGH BOILER AND CONTROLLING SYSTEM FOR PERFORMING THE METHOD
Vagn Kollerup, Copenhagen, Denmark, assignor to Aktieselskabet Burmeister & Wain's Maskin-og Skibsbyggeri, Copenhagen, Denmark, a company of Denmark
Filed Aug. 26, 1963, Ser. No. 304,583
Claims priority, application Denmark, Aug. 27, 1962, 3,752
12 Claims. (Cl. 122—451)

This invention relates to a method for controlling a once-through boiler by means of a controlling pulse on the basis of a measurement of a quantity of state in the boiler system, and a controlling system for performing the method. The controlling pulse may for instance be used for controlling the amount of feed water or possibly for controlling the amount of fuel supplied.

Such once-through boilers may for example be boilers according to the Benson principle, the so-called Benson boilers.

Figure 1:
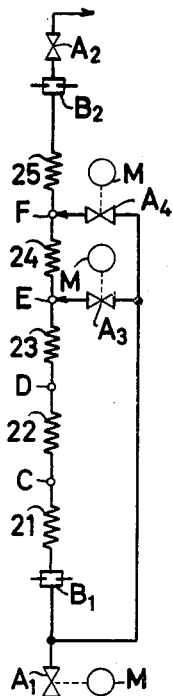

In the interest of clarity the construction of such boiler is diagrammatically shown in FIG. 1 of the drawing.

The boiler consists of a tube system to which water is supplied through a valve $A_1$, which may be controlled by a motor M. The water flows through the individual tube sections 21–25 of the boiler, to which heat is supplied by combustion of fossil fuels, so that the water is heated and evaporates and is finally superheated whereupon it leaves the tube system as superheated vapour through a valve $A_2$. The tube sections may be divided into an economiser 21, an evaporation system 22, inclusive of a residual evaporator, a presuperheater 23 and superheater sections 24 and 25.

The heat content (enthalpy) of the vapour and consequently the temperature thereof is determined by the flowing amount of water and the heat quantity supplied by the combustion. The discharge temperature of the vapour at the valve $A_2$ may in a known manner be adjusted by injecting feed water, for example in two steps, such as at the points designated E and F, which are located between sections 23 and 24 and sections 24 and 25, respectively. The amount of feed water injected at the point E through a valve $A_3$ may for example be adjusted dependent on the temperature measured immediately after the point E while the amount of feed water injected at the point F through a valve $A_4$ may be adjusted dependent on the temperature immediately after the point F or dependent on the vapour discharge temperature at the valve $A_2$ or dependent on both temperatures.

The temperature in the system prior to the first injection at the point E is solely determined by the amount of feed water supplied and by the heat quantity supplied by the combustion, and this temperature can only be adjusted by adjusting the ratio between the amount of feed water introduced and the amount of fuel used.

The amount of vapour measured at an orifice plate $B_2$ between the section 25 and the valve $A_2$ may be used as controlling pulses for the amount of feed water in such a manner as to provide conformity between the amount of vapour discharged and the amount of feed water supplied measured at an orifice plate $B_1$ between the valve $A_1$ and the economiser 21.

As correction for this feed water control may be used a measurement which is an expression for the temperature in the system where the vapour is super-heated, for example at the point D or at the point E, it being hereby possible to ensure that the temperature at the point concerned does not exceed the maximum permissible temperature which for economic reason is always essentially lower than the vapour discharge temperature.

Instead of a temperature measurement it is also possible to use the amount of water injected through the valve $A_3$ in that this amount will be an indirect measure for the temperature at the point E.

For the purpose of obtaining a fast controlling pulse to the feed water valve $A_1$, it is desirable that the measuring of the temperature takes place as closely as possible, to the feed water inlet which, however, normally involves difficulties in that the measurement must be performed at a place where the temperature is an expression for variations in the heat quantity supplied. This is, as is well known, not so in the case of a vapour-water mixture which has a saturation temperature, in that the temperature will only change by variation of the heat quantity when the water either has a temperature below the saturation temperature, or has entirely evaporated and is super heated. This state of things means that controlling systems based on direct or indirect temperature measurings, should always use points of measurement lying within the super-heating range and, as a consequence thereof, at a rather late time of the flow in the system with consequential great time delay. A measurement of the temperature variations in the pure water phase, for example a temperature rise across the economiser 21, is namely not practically applicable, because the calorific variations, as far as this heating surface is concerned, are not unambiguous expressions for the calorific variations to the super heater sections.

Moreover, the use of a direct temperature measurement is also encumbered with the drawback that it will supply an erroneous controlling pulse if the temperature at the point of measurement momentarily falls to the saturation temperature when measuring in the vapour phase or rises to the saturation temperature when measuring in the water phase, which risk will always be involved if the point of measurement lies close to the saturation temperature.

Other known measuring methods employ as controlling pulse the temperature rise across a tube element located in a hot smoke gas zone and flown through by a partflow proportional to the main flow. This measuring will, however, not under all conditions be an expression for temperature variations in the main system and will, consequently, be less suitable.

The invention has for its object to provide a measuring value affording a more safe and reliable measurement, whereby the controlling which takes place by means of a controlling pulse on the basis of the measurement concerned will also be accurate and reliable.

The method according to the invention is characterised in using a measuring value as controlling pulse, which measuring value is an indirect expression for the heat content at a point of measurement for the working medium where this medium is in the form of vapour or vapour-water mixture. In so doing a measurement of the state of the flowing medium is obtained in a manner corresponding exactly to the said state at the point of measurement, and this point may likewise lie comparatively close to the feed water inlet.

More specifically, the procedure adopted by the method according to the invention is that at a point in the system where the working medium is in the form of vapour or of vapour-water mixture, a sample or part-flow of the medium is taken, whereupon said part-flow is directed to a measuring device in which said part-flow, for example by means of a built-in electrical heating element is supplied with such quantity of heat that at a point immediately after said measuring device the temperature is kept at a constant value. In so proceeding, the said quantity of heat will be an expression for the heat content at the point of sampling, for example, be reversely proportional to said heat content.

According to the invention the pressure of the part-flow derived is expediently reduced to a constant pressure, for example by means of a reduction valve, prior to the said part-flow being directed to the measuring device and subsequently, to having passed the measuring devise the part-flow is expediently discharged in such a manner that at the point of discharge the pressure is kept constant or substantially constant. By this procedure, the advantage is obtained that the leaving quantity will always be constant so that the quantity of heat supplied to the measuring device will be an unambiguous expression for the heat content of the sample or part-flow derived, measured for example in kcal./kg.

A controlling system intended for performing the method according to the invention and comprising a measuring device for reception of a part-flow of vapour or vapour-water mixture from the boiler is characterised by a controlling device for controlling a quantity of heat supplied to the measuring device and by another controlling device which is adapted for receiving pulses partly from the feed water flow, partly from the vapour flow, partly from an effect meter for the heat supply to the measuring device, for example to an electrical heating element in said device, the latter controlling device being connected with an inlet valve, controlled for example by a motor, for the feed water flow, and being moreover so arranged that in the case of variation of the vapour flow leaving the boiler it causes a proportional change in the feed water flow, whilst in the case of variations in excess of certain predetermined values of the heat content measured by the measuring device, it involves a correction of the feed water flow adapted to said content.

For the purpose of providing a constant pressure at the point of discharge, provision may according to the invention be made for an orifice plate after the measuring device at the discharge of the part-flow. Such orifice plate may, if so desired, be adjustable and likewise it may, if so desired, be constructed as a multi-stage orifice plate, namely with a view to obtaining orifices of a suitable size, because the dimensions of the orifice plate will normally be rather small. Out of regard to dirt the orifice plate should also be readily detachable.

According to a further embodiment of the controlling system according to the invention, this system may comprise a special controlling device which is arranged for automatically varying or displacing, dependent on the load, the pulse to be transmitted from the effect meter to the above mentioned pulse-receiving controlling device.

Further embodiments of the invention will appear from the following description and from the patent claims.

The invention is illustrated in the accompanying drawing, where

Figure 3:
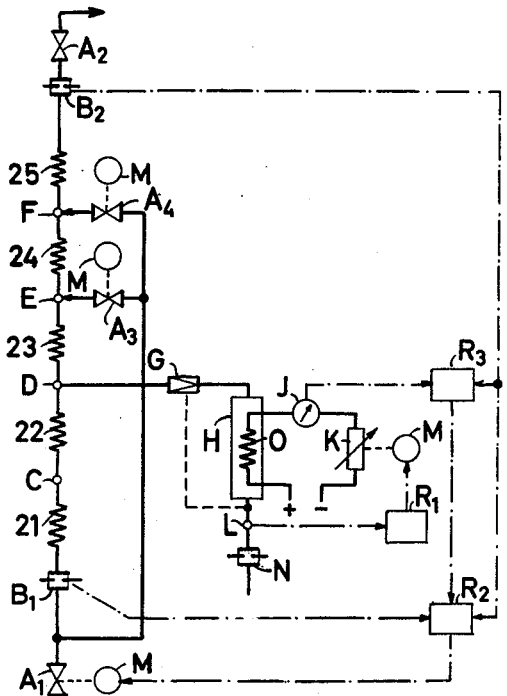
Figure 4:
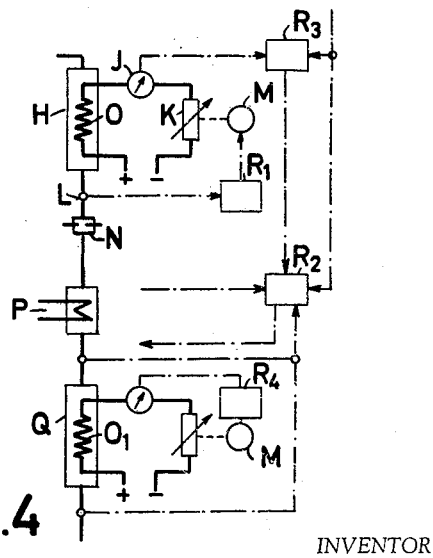
Figure 2:
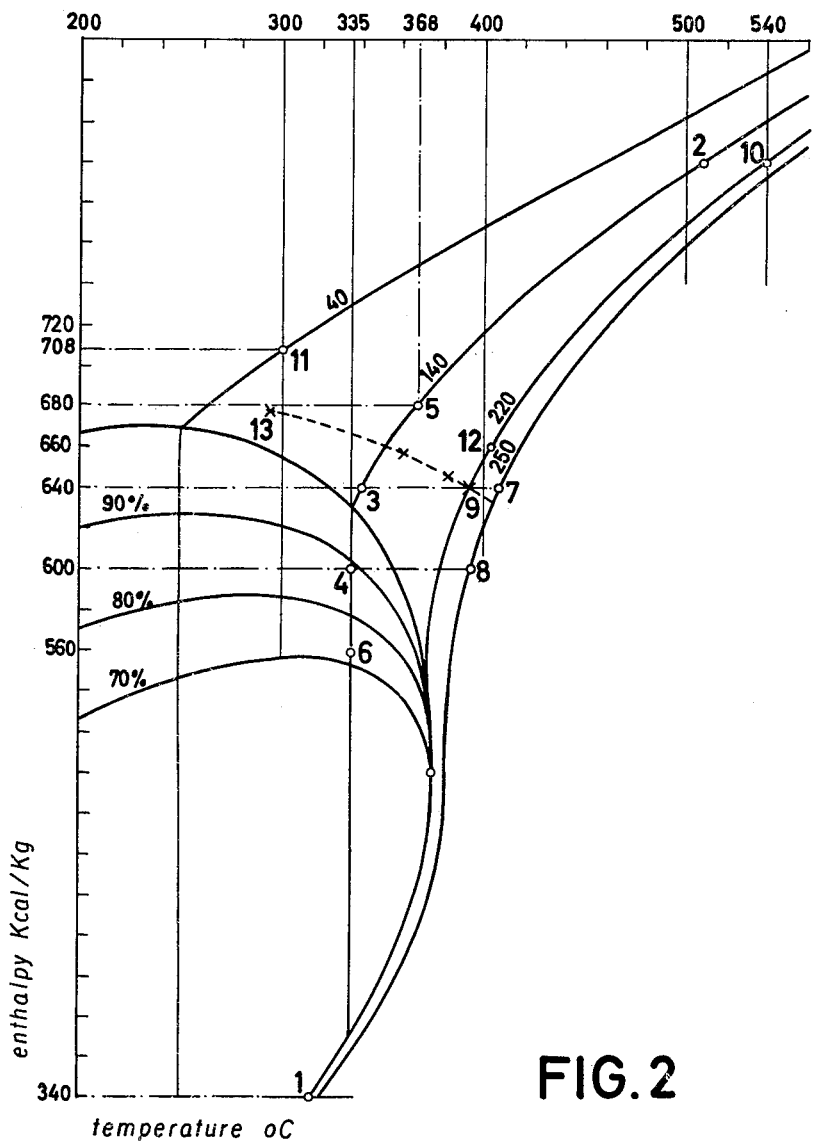
Figure 5:
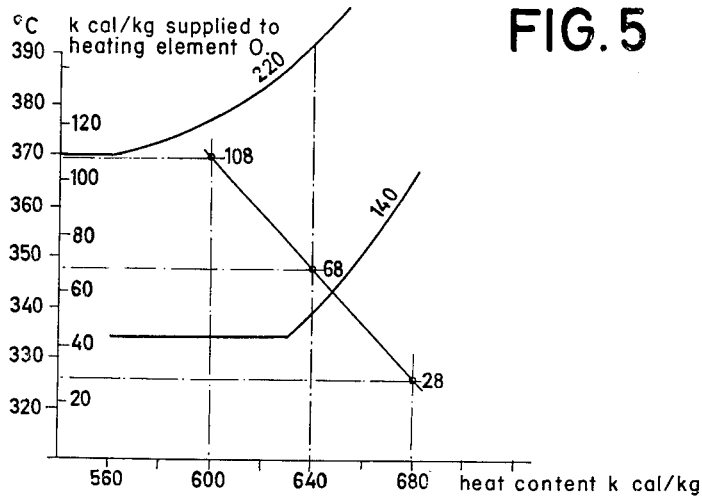
Figure 6:
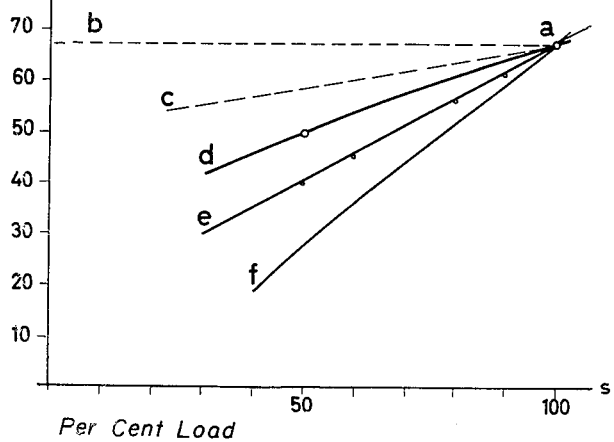

FIG. 1 shows as already mentioned, diagrammatically the construction of a once-through boiler, FIG. 2 is a section of an enthalpy-temperature diagram of water vapour, FIG. 3 shows diagrammatically the principal construction of a controlling system for the boiler shown in FIG. 1 according to an embodiment of the invention, FIG. 4 shows in a similar manner a modified embodiment of the controlling system, FIG. 5 is a diagram showing—at two different pressures—partly the variation of the temperature at a point of measurement as a function of the varying heat content of the vapour or the vapour-water mixture, partly the quantity of heat supplied to the heating element in the measuring device, as a function of the said heat content, and FIG. 6 is a diagram showing the heat reception in the measuring device as a function of the load under a number of different assumptions.

The arrangement of the controlling system shown as well as the use thereof and its mode of operation will appear from the following description.

At the point D, FIGS. 1 and 3, located between the evaporation system 22 and the pre-superheater 23, a representative part-flow of vapour or vapour-water mixture is derived, the pressure of said part-flow being by means of a reduction valve G, FIG. 3, reduced to a constant pressure, for example 40 ata. The part-flow is from the reduction valve directed to a measuring device H, in which an electrical heating element O is built in. The sample or part-flow derived is from the measuring device H discharged through a calibrated orifice plate N. The quantity of heat supplied to the part-flow in the measuring device H, which quantity of heat may be taken from the electrical circuit shown in the drawing, is controlled by means of a controlling device $R_1$ of a type well-known in such a manner that the temperature measured at the point designated L immediately after the measuring device, is kept at a constant value, for example 300° C. The controlling device $R_1$ actuates via a motor M a variable resistance K which is inserted in said electrical circuit. Said circuit comprises also an effect meter J which indicated the quantity of heat supplied to the electrical heating element O. As a constant pressure of the measured part-flow is maintained by means of the reduction valve G in conjunction with the orifice plate N, and as a constant temperature is maintained after the measuring device so that the amount of flow is also kept constant, the quantity of heat supplied to the measuring device H and indicated by the effect meter J (which may be a transformer of measured values such as the type 361 manufactured by Søren T. Lyngsø of Denmark) will be an unambiguous expression for the heat content of the sample or part-flow derived, measured for example in kcal./kg., for example be inversely proportional to the said heat content.

The controlling system shown in FIG. 3 comprises moreover a controlling device $R_2$ of a well-known type which is built up of electrical components which is arranged for receiving different pulses, namely partly from the feed water flow, for example measured at the orifice plate $B_1$, partly from the vapour flow, for example measured at the orifice plate $B_2$, partly from the effect meter J for the supply of heat to the measuring device H. This controlling device $R_2$ will subsequently transmit a pulse to the motor-controlled valve $A_1$, in that the controlling device functions in such manner that a variation in the vapour flow measured at the orifice plate $B_2$ will involve a proportional variation in the water flow. If, however, the heat content of the derived part-flow measured in the measuring device H, varies in excess of predetermined values, the controlling device $R_2$ will from the effect meter J receive a pulse which causes a correction of the feed water flow.

The additional controlling device $R_3$ shown in FIG. 3 will be mentioned further below.

By means of the section shown in FIG. 2 of an enthalpy-temperature diagram for water vapour, the function of the system can be explained through an example.

It is assumed that the state at the sampling point D, FIGS. 1 and 3, with respect to pressure and heat content is 140 ata. and 640 kcal./kg., respectively, which corresponds to point 3 of the diagram FIGURE 2. The said pressure is reduced by means of the reducing valve F so that the part-flow supplied to the measuring device H has a pressure of 40 ata. while the controlling device $R_1$ is assumed to be so adjusted as to keep the temperature in the point L immediately after the measuring device at 300° C., i.e. corresponding to point 11 in the diagram. From this diagram it will be seen that by means of the heating element O a quantity of heat of 68 kcal./kg. is then supplied to the part-flow, namely 708÷640.

If the state at the sampling point D should vary such that the heat content is only 600 kcal./kg., while the pressure is still 140 ata., corresponding to point 4 in the diagram, a quantity of heat of 108 kcal./kg. is to be supplied through the heating element O, namely 708÷600, in order to attain the state in point 11.

If, on the other hand, the state in point D alters to 680 kcal./kg. and still 140 ata., corresponding to point 5, a quantity of heat of 28 kcal./kg., namely 708÷680, is to be supplied through the heating element O.

The temperature, which the controlling device $R_1$ is to maintain, i.e. corresponding to point 11 in FIG. 2, is so chosen that a positive quantity of heat is normally always to be supplied from the heating element O, but if the abnormal state should occur that the supply of heat from the heating element should be negative, the system may be so arranged that the said controlling device automatically adjusts the temperature in point 11 upwardly until the supply of heat from the heating element reaches zero. The amount, which the temperature in point L in FIG. 3 is displaced in order to maintain the effect at zero, may be used as an expression for the negative quantity of heat which was to be supplied to the heating element, and this pulse may then automatically be supplied to the controlling device $R_3$ of a type well-known and which is built up of electrical components including servo mechanisms similar to device $R_2$ as long as the heat content at the measuring point D is too high.

By the diagram shown in FIG. 5 it is stated how the temperature at the measuring point D alters in the case of varying heat contents in that there are stated two curves corresponding to pressures at the measuring point of 140 ata. and 220 ata., respectively. From these curves it will be seen that a temperature measurement as previously explained is not applicable as a controlling pulse in the range of saturation in that this corresponds to the horizontal part of each curve, and it will further be seen that the temperature gradient measured in ° C. per kcal./kg. is especially small at high pressures and will, therefore, be less suitable as controlling pulse in the vicinity of the point of saturation. The measuring method suggested by the invention is in contrast thereto not encumbered with these drawbacks in that the quantity of heat supplied through the heating element O will be reversely proportional to the heat content in the steam or the vapour-water mixture such as it is shown by the drawn straight line which passes through three points corresponding to the above-mentioned three states with heat contents of 600, 640 and 680 kcal./kg., respectively, and with quantities of heat supplied of 108, 68 and 28 kcal./kg., respectively, i.e. corresponding to the points 4, 3 and 5, respectively in FIG. 2.

Once-through boilers according to the Benson-principle, i.e. boilers without fixed evaporation point may be driven either with a fixed discharge pressure or with a variable discharge pressure, which for example may vary proportionally to the load, the so-called sliding pressure.

If the boiler operated with a discharge state of for example 220 ata. and 540° C., corresponding to point 10 in FIG. 2, and if, moreover the desired state at the measuring point D in FIG. 3 is 220 ata. and 640 kcal./kg. corresponding to point 9 in FIG. 2, while the measuring device H is adjusted to maintain the state in conformity with point 11 in FIG. 2, i.e. 40 ata. and 708 kcal./kg., a quantity of heat of 68 kcal./kg., namely 708÷640, is to be supplied to the heating element O in the measuring device H.

Out of regard to keeping the vapour discharge temperature constant in the case of partial load, it will often be desirably, if the load is reduced, that the superheater part of the boiler is increased, which is to be so understood that the super-heating commences further down in the boiler system, and this means that the state at the measuring point D in FIG. 3 is to be altered towards a higher heat content, for example to the state 660 kcal./kg. while the pressure is still 220 ata., i.e. corresponding to point 12 in FIG. 2. In such case 48 kcal./kg., namely 708÷660, is to be supplied to the measuring device H.

In the diagram in FIG. 6 this altered supply of heat is shown as function of the load $s$ by means of a number of curves $a$–$b$, $a$–$c$ etc., corresponding to the different assumptions. This altered supply of heat may be adjusted by means of the controlling device $R_3$ shown in FIG. 3, in that a load pulse is supplied to said controlling device, which pulse automatically displaces the pulse which is received from the effect meter J and which is transmitted to the controlling device $R_2$.

The dotted line $a$–$b$ in FIG. 6 corresponds to a constant supply of heat to the measuring device H over the entire load range and with a fixed discharge presure. If the controlling device $R_3$ is adjusted thereto, it will mean that the state at the measuring point of sampling point D, FIG. 3, is constant or, in other words, that the evaporation point is kept constant which normally will give a falling vapour discharge temperature at lower load if said temperature cannot solely be controlled by water injections through the valve $A_3$ and/or the valve $A_4$, FIG. 3.

Like the line $a$–$b$, the dotted line $a$–$c$ in FIG. 6 corresponds to a fixed discharge pressure whereas the supply of heat to the measuring device H is increased proportionally to the load.

In the following the case will be considered where the boiler operates with a constant discharge temperature and with sliding pressure, which means that the discharge pressure is controlled proportionally to the load. If it be assumed that the state at top load is the same as stated above, i.e. 220 ata. and 540° C., corresponding to point 10 in FIG. 2, and if furthermore it be assumed that the supply of heat in the boiler system from the point D to the orifice plate $B_2$ in FIG. 3 is unchanged, measured in kcal./kg., over the entire load range, the state at the measuring point D is to alter according to the dotted curve 9–13 in FIG. 2 which means that a quantity of heat is to be supplied to the measuring device H varying according to the fully drawn curve $a$–$e$ in FIG. 6. This variation may be adjusted automatically by the controlling device $R_3$.

If the super-heater surface is increased in the case of lower load and at sliding pressure or variable pressure as disclosed in "Combustion," December 1962, pages 32–38 so that consequently an increased heat reception takes place in the super heater, this means that the controlling device is to be adjusted according to a somewhat lower positioned curve, for example according to the fully drawn curve $a$–$f$ in FIG. 6 while reversely, a reduction of the superheater surface and, consequently, a reduced heat reception in the superheater will be tantamount to an adjustment according to a higher positioned curve, for example according to the fully drawn curve $a$–$d$ in FIG. 6. The various curve pitches are determined by the characteristic of the plant, and the adjustment takes place automatically by means of the controlling device $R_3$.

In the references made to the $i$–$t$-diagram in FIG. 2, and the use of this diagram, no regard has been had to pressure drops in the system, and likewise the interdependence between temperatures, pressures and heat contents are rounded values which, however, in the present connection is of less significance.

The basis of the above-described measuring system is that a constant vapour flow or vapour-water flow passes continuously through the measuring device H, FIG. 3, determined by the reduction valve G and the orifice plate N. for checking the amount of this flow it is, however, possible to introduce a supplementary measuring quantity.

FIG. 4 illustrates diagrammatically the arrangement of a system further elaborated with a view hereto. The upper part of FIG. 4 corresponds to the detail shown at the right-hand side of FIG. 3, but the amount of vapour discharged through the measuring orifice plate N is according to FIG. 4 directed to a condenser P, in which the vapour is condensed, and the condensate flows on to a measuring device Q having a built-in electrical heating element $O_1$. If this heating element $O_1$ gives up a constant quantity of heat to the condensate, in that the quantity of heat is kept constant by means of a controlling device $R_4$, the heating of the condensate, i.e. the difference between the temperature before and after the measuring device Q, will be a direct measure for the amount of flow. This amount will normally be constant, namely under the provision of constant pressure and temperature at the orifice plate N. In the course of time, however, an alteration may take place, for example by the measuring orifice plate N having been subject to wear, but by introducing the above-mentioned temperature difference in the controlling device $R_2$, it will be possible to effect an automatic compensation for variations occurring in the amount of flow.

In the practical application of the method and the controlling system according to the invention, certain precautions should, however, be observed.

The sampling should thus be made in such a manner as to obtain a representative sample and this should be derived at a place where the flowing vapour or vapour and water is properly mixed. The connection pipe from the sampling point should be of a small cross section, and likewise the distance from the sampling point to the measuring device should be short. The dimensions and the heating capacity of the measuring device should be the smallest possible.

As a constant temperature is to be maintained after the measuring device, and as the temperature at the inlet to said arrangement will normally only vary to a small extent, variations in the mean temperature of the measuring device will be small and without any greater significance for the accuracy of the controlling procedure but in order to make the error the smallest possible, the measuring device should be performed with the lowest possible specific heat. The measuring device may, therefore, expediently be a thin-walled tube through which the sample flows, and the heating member may be constituted of a resistance wire positioned inside the tube and made of an anti-corrosive material.

For the purpose of ensuring the smallest possible time delay in the measuring process, the temperature may be measured with the lowest possible heating capacity, for example by means of a thermal element in a thin-walled protection tube.

What I claim is:

1. In the operation of a once-through boiler employing water as the working medium therein, said boiler being controlled by adjustment of the rate of at least one of two decisive factors, viz. the feed water input and the input of heating calories, in response to heat content of the working medium, the method which comprises measuring the temperature of a quantity of the working medium taken from a point in the boiler where the said medium at least partially is in the form of vapour, the pressure of said quantity of said working medium having been reduced to a predetermined constant value, supplying said quantity of medium with a quantity of heat to bring said temperature to a predetermined constant value, the pressure of the said measured quantity being maintained at said reduced value, and converting said quantity of heat into an adjustment of the rate of input of at least one of said decisive factors.

2. In the operation of a once-through boiler employing water as the working medium therein, said boiler being controlled by adjustment of the rate of at least one of two decisive factors, viz. the feed water input and the input of heating calories, in response to heat content of the working medium, the method which comprises measuring the temperature of a quantity of the working medium taken from a point in the boiler where the said medium at least partially is in the form of vapour, reducing the pressure of said quantity of said working medium to a predetermined constant value, supplying said quantity of medium with a measured quantity of heat sufficient to bring said temperature to a predetermined constant value, the pressure of the part-flow being maintained at said predetermined constant value during said measurement, measuring the rate of feed water input, measuring the rate of vapour exhaust flow, combining said measurement of heat supplied, feed water input and exhaust flow and converting said combined measurements into an adjustment of the rate of input of at least one of said decisive factors.

3. In the operation of a once-through boiler employing water as the working medium therein, said boiler being controlled by adjustment of the rate of at least one of two deciding quantities, viz. the feed water input and the input of heating calories, in response to heat content of the working medium, the method which comprises withdrawing a part-flow of the working medium from a point in the boiler where the said medium at least partially is in the form of vapour, reducing the pressure of said part-flow of said working medium to a predetermined constant value, whereupon said part-flow is directed to a point of measuring where said part-flow is supplied with such quantity of heat that the temperature, immediately after said measuring point, is kept at a constant value, and where, besides, the pressure of the part-flow is maintained at said predetermined constant value, whereby the said quantity of heat will be an expression for the heat content at the deriving point and converting said quantity of heat into an adjustment of the rate of input of at least one of said decisive factors.

4. A method as claimed in claim 3, and wherein the part-flow derived is supplied with heat by means of electrical heating.

5. In combination with a once-through boiler, apparatus for selectively adjusting the input rate of feed water and heat to said boiler, comprising means for supplying a continuous flow of the working medium, at least partially in the form of a vapour, from the boiler at a predetermined reduced constant value to a temperature measuring device for said working medium, means to provide heat to the measuring device to bring said medium to a desired temperature, means for controlling the quantity of heat supplied to said heating means, means to measure the amount of heat supplied to said heating means and transmit said measurement, means arranged for receiving, transforming and transmitting said heat measurement to a motor connected with a supply valve on said boiler to adjust the feed-water input for said boiler.

6. In combination with a once-through boiler, apparatus for selectively adjusting the input rate of feed water and heat to said boiler, comprising means for supplying a continuous flow of the working medium, at least partially in the form of a vapour, from the boiler to a temperature measuring device for said working medium, means for reducing the pressure of the said flow to a constant pressure prior to the introduction of said flow for said measuring device, means to heat the measuring device to bring said medium to a desired temperature, means for controlling the quantity of heat supplied to said heating means, means to measure the amount of heat supplied to said heating means and to transmit said measurement, means to measure the feed-water-input, means to measure the exhaust vapour flow from said boiler, means arranged for receiving and transforming measurements of the feed-water-input and of the exhaust vapour flow and from the heat measuring means, said receiving and transforming means being further adapted to transmit said transformed measurements as impulses to a motor connected with a supply valve on said boiler to adjust the feed-water-input for said boiler.

7. A controlling system for performing the method according to claim 3, comprising a temperature measuring device for said working medium, means for supplying to said measuring device a continuous partial flow of the said working medium, at least partially in the form of a vapour, from the boiler, a reduction valve for reducing the pressure of the said flow to a constant pressure, a heating device for the measuring device means to measure the feed-water-input, means to measure the exhaust vapour flow from the boiler, a first controlling device for controlling the quantity of heat supplied to the measuring device, an effect meter for the supply of heat to said measuring device, a second controlling device arranged for receiving, transforming and transmitting pulses, partly from the feed-water-input, partly from the exhaust vapour flow, and partly from the effect meter, said second controlling device being connected with a motor controlled supply valve for the feed-water-input, and being, moreover, so arranged that in the case of alteration of the vapour flow leaving the boiler, it causes a proportional alteration in the feed-water-flow, while in the case of variation in excess of certain predetermined values of the heat content measured by the said measuring device, it further involves a correction of the feed-water-flow adapted to said heat content.

8. A controlling system as claimed in claim 7 and wherein an orifice plate has been provided after the measuring device, at the discharge for the said flow after heat measurement.

9. A controlled system as claimed in claim 8, wherein said orifice plate is adjustable.

10. A controlling system as claimed in claim 7, also comprising a third controlling device arranged for automatically varying, dependent on the load, the pulse which is transmitted from the effect meter to said second controlling device.

11. A controlling system as claimed in claim 8, also comprising a condenser, located below the said orifice plate, and a second temperature measuring device, through which flows the condensate coming from the condenser, for supplying heat to said condensate by means of an electrical circuit comprising a second heating element, said circuit being connected with a fourth controlling device for adjusting the quantity of heat supplied.

12. A controlling system as claimed in claim 11, wherein the said second controlling device is adapted for being responsive to variations in the difference between the temperature measured after and before the said second temperature measuring device to compensate for possible alterations in the amount of condensate flow.

References Cited by the Examiner

UNITED STATES PATENTS

| 3,081,750 | 3/63 | Profos | 122—448 |
| 3,086,504 | 4/63 | Profos | 122—451 |
| 3,162,179 | 11/64 | Strohmeyer | 122—448 |

FREDERICK L. MATTESON, JR., *Primary Examiner.*

KENNETH W. SPRAGUE, ROBERT A. O'LEARY, *Examiners.*